United States Patent
Johansson

(10) Patent No.: US 11,056,818 B2
(45) Date of Patent: Jul. 6, 2021

(54) ELECTRICAL OUTLET WITH FEMALE MEMBER MOVEABLE BETWEEN CONNECTED AND DISCONNECTED PORTIONS

(71) Applicant: Roland Johansson, Vittsjö (SE)

(72) Inventor: Roland Johansson, Vittsjö (SE)

( * ) Notice: Subject to any disclaimer, the term of this patent is extended or adjusted under 35 U.S.C. 154(b) by 0 days.

(21) Appl. No.: 16/311,009

(22) PCT Filed: Jun. 20, 2017

(86) PCT No.: PCT/SE2017/050672
§ 371 (c)(1),
(2) Date: Dec. 18, 2018

(87) PCT Pub. No.: WO2017/222458
PCT Pub. Date: Dec. 28, 2017

(65) Prior Publication Data
US 2020/0313337 A1 Oct. 1, 2020

(30) Foreign Application Priority Data
Jun. 21, 2016 (SE) .................................... 1630159-0

(51) Int. Cl.
*H01R 13/44* (2006.01)
*H01R 13/625* (2006.01)
(Continued)

(52) U.S. Cl.
CPC ........... *H01R 13/44* (2013.01); *H01R 13/625* (2013.01); *H01R 13/66* (2013.01); *H01R 24/005* (2013.01);
(Continued)

(58) Field of Classification Search
CPC H01R 2103/00; H01R 13/44; H01R 13/4532; H01R 13/652; H01R 13/71;
(Continued)

(56) References Cited

U.S. PATENT DOCUMENTS 5,035,635 A * 7/1991 Tsai ........................ H01R 13/44
439/188
5,286,213 A 2/1994 Altergott et al.
(Continued)

FOREIGN PATENT DOCUMENTS

DE 2832105 A1 1/1980

OTHER PUBLICATIONS

International Search Report, Application No. PCT/SE2017.050672, dated Sep. 27, 2017, 3 pages.

*Primary Examiner* — Abdullah A Riyami
*Assistant Examiner* — Justin M Kratt
(74) *Attorney, Agent, or Firm* — Ziegler IP Law Group, LLC

(57) ABSTRACT

An electrical outlet has a female member with at least two electrically conductive contact sleeves for the reception of the pins on a plug inserted in the female member and a connector arrangement for connection of the electrical outlet to a mains supply. The female member is movable relative to the connector arrangement between a first mode, in which the contact sleeves are electrically disconnected from the mains supply, and a second mode, in which contact sleeves are electrically connected to a mains supply. The connector arrangement include a connection ring and a mounting plate. The connector arrangement further include connection plates, whose number corresponds to the number of contact sleeves on the female member, wherein each contact sleeve is brought in or out of contact with a connection plate by movement of the female member.

5 Claims, 13 Drawing Sheets

(51) Int. Cl.
  *H01R 13/66*   (2006.01)
  *H01R 24/00*   (2011.01)
  *H01R 24/76*   (2011.01)
  *H01R 43/26*   (2006.01)
  *B60L 53/16*   (2019.01)
  *H01R 13/703*   (2006.01)
  *H01R 9/24*   (2006.01)
  *H01R 13/453*   (2006.01)
  *H01R 24/46*   (2011.01)
  *H01R 13/71*   (2006.01)
  *H01R 13/652*   (2006.01)
  *H01R 33/96*   (2006.01)
  *H01R 103/00*   (2006.01)
  *H01R 35/04*   (2006.01)

(52) U.S. Cl.
  CPC ............. *H01R 24/76* (2013.01); *H01R 43/26* (2013.01); *B60L 53/16* (2019.02); *H01R 9/2433* (2013.01); *H01R 13/453* (2013.01); *H01R 13/4532* (2013.01); *H01R 13/652* (2013.01); *H01R 13/703* (2013.01); *H01R 13/7031* (2013.01); *H01R 13/71* (2013.01); *H01R 24/46* (2013.01); *H01R 33/96* (2013.01); *H01R 35/04* (2013.01); *H01R 2103/00* (2013.01)

(58) Field of Classification Search
  CPC .... H01R 13/453; H01R 13/703; H01R 35/04; H01R 24/005; H01R 13/625; H01R 13/66; H01R 24/76; H01R 43/26; H01R 9/2433; H01R 24/46; H01R 33/96; B60L 53/16
  USPC ............. 439/20, 21; 200/43.03, 51 R, 51.06, 200/51.07, 51.09, 51.12, 51.17, 51.13
  See application file for complete search history.

(56) References Cited

U.S. PATENT DOCUMENTS

| | | |
|---|---|---|
| 5,484,299 A | 1/1996 | Schlessinger |
| 6,332,794 B1 * | 12/2001 | Tzeng Jeng ........... H01R 35/04 439/13 |
| 2006/0172583 A1 | 8/2006 | Duhe, Jr. |

* cited by examiner

ELECTRICAL OUTLET WITH FEMALE MEMBER MOVEABLE BETWEEN CONNECTED AND DISCONNECTED PORTIONS

TECHNICAL AREA

The aspects of the disclosed embodiments generally relate to electrical outlets and in particular to special electrical safety at such outlets.

In the description, the claims and the abstract below the term outlet refer to the part of an electrical installation which is connected to the supply mains. The term electrical connector is the part that is connected to the power outlet to provide a device with electricity, for example a battery in an electric car.

BACKGROUND

Power outlet is generally energized even in a sleep mode. Tamperproof is available in the form of so-called child protection. These prevent small children from inserting objects into the outlet. The child protection is installed mainly in the electrical outlet that is not used frequently. Safety precautions for three phase outlets outdoors require an installation at least 170 cm above ground level (Swedish rules) in order to reduce the risk of tamperproof attacks.

SUMMARY

The main purpose of the aspects of the disclosed embodiments are to eliminate the risk of damage to the people who manipulate the power outlet by putting objects in the female plug sockets.

A further purpose of the aspects of the disclosed embodiments are to provide a safe outlet that is adapted to the electrical contacts that are already on the market.

These purposes are achieved with an electrical outlet in accordance with the subsequent claims.

Additional aspects, advantages, characteristics and purposes of this description will appear in the attached drawings and the detailed description of drawings.

It should be acknowledged that the special features and properties as shown below can be combined in various ways without falling outside of the scope of protection created by the subsequent patent claims.

BRIEF DESCRIPTION OF THE DRAWINGS

Embodiments of the present disclosure will be described with reference to the accompanying drawings, in which.

DETAILED DESCRIPTION

The following description illustrates an embodiment of the present disclosure. A person skilled in the art should realize that other solutions than those described is possible without the innovative idea is waived and that such solutions falls into the scope of the subsequent patent claims.

Figure 1:
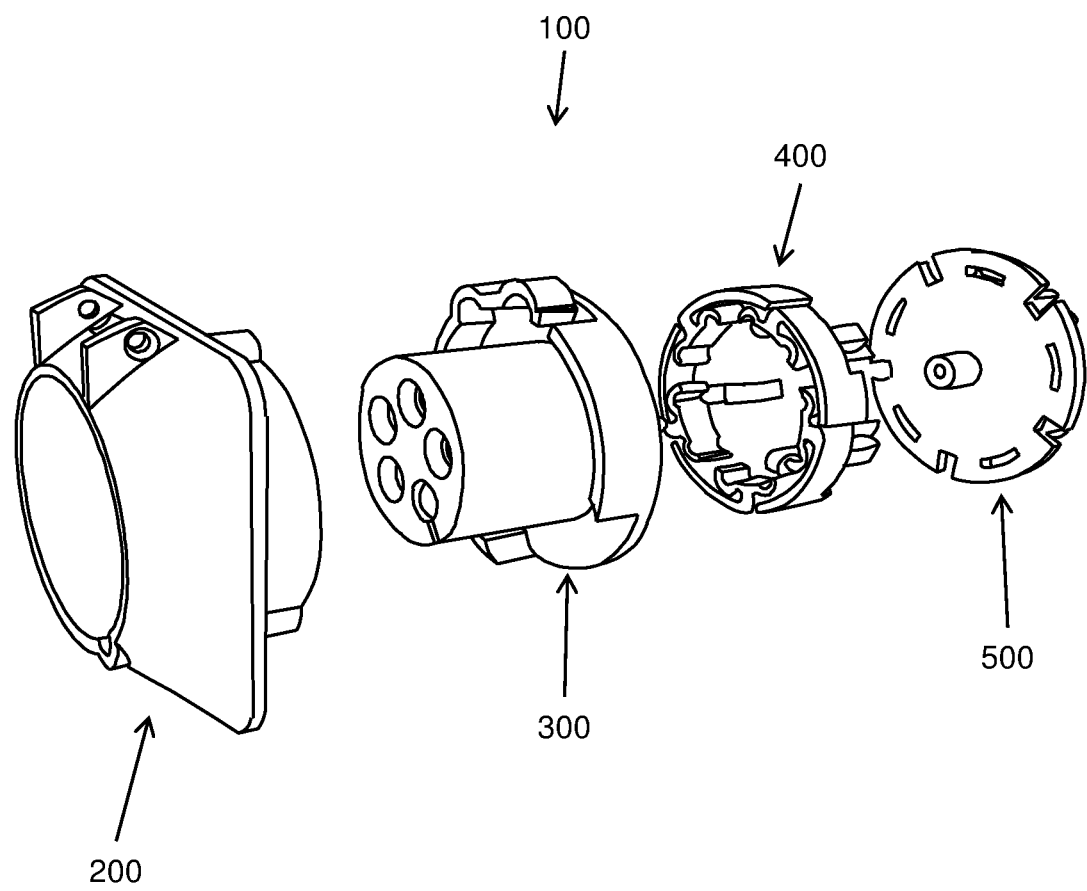
FIG. 1 shows an exploded view of an embodiment of an electrical outlet in accordance with the present disclosure.

In an embodiment, there is disclosed an electrical outlet 100 as shown in FIG. 1. The electrical outlet 100 includes a female member 300 with at least two electrically conductive contact sleeves 303 (shown in FIG. 3) for the reception of the pins on a plug 600 inserted in the female member and a connecting means 400, 500 for connection of the electrical outlet 100 to a mains supply. Optionally, the female member 300 may be rotatable relative to the connecting means 400, 500.

FIG. 1 shows an electrical outlet 100 according to one embodiment of the invention and the exploded view illustrates the four interacting components, a front 200, a female component 300, and a connecting means comprising a connection ring 400 and a mounting plate 500. The outlet is mounted in a box in a wall or in a device which may be mounted on a wall or on a pole.

Figure 2:
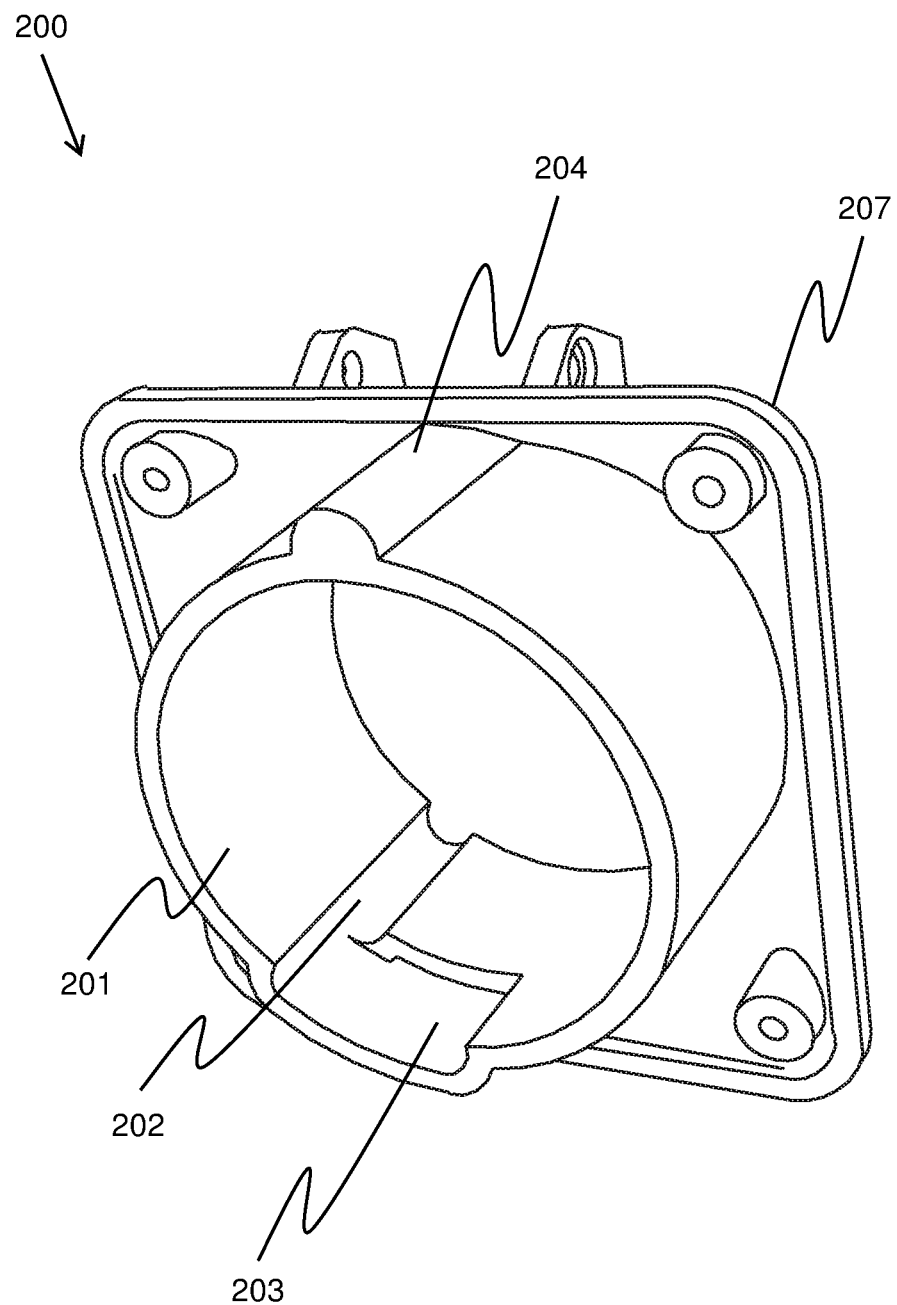
FIG. 2 in perspective from behind shows a front of the electrical outlet.

FIG. 2 shows the front 200 with a front plate 207 and a cylindrical sleeve 201. The front plate 207 is attached to e.g. a wall. The cylindrical sleeve 201 extends backwards from the front plate 207 for receiving the female component 300. On the inside of the cylindrical sleeve 201 is an axial groove 202, which turns into a circumferential groove 203 for the formation of an L-shaped groove. On the outside of the sleeve, approx. 180 degrees from the L-shaped groove, is a locking ridge 204 formed. The function of the L-shaped grove and locking ridge 204 will be described in more detail below.

Figure 3A:
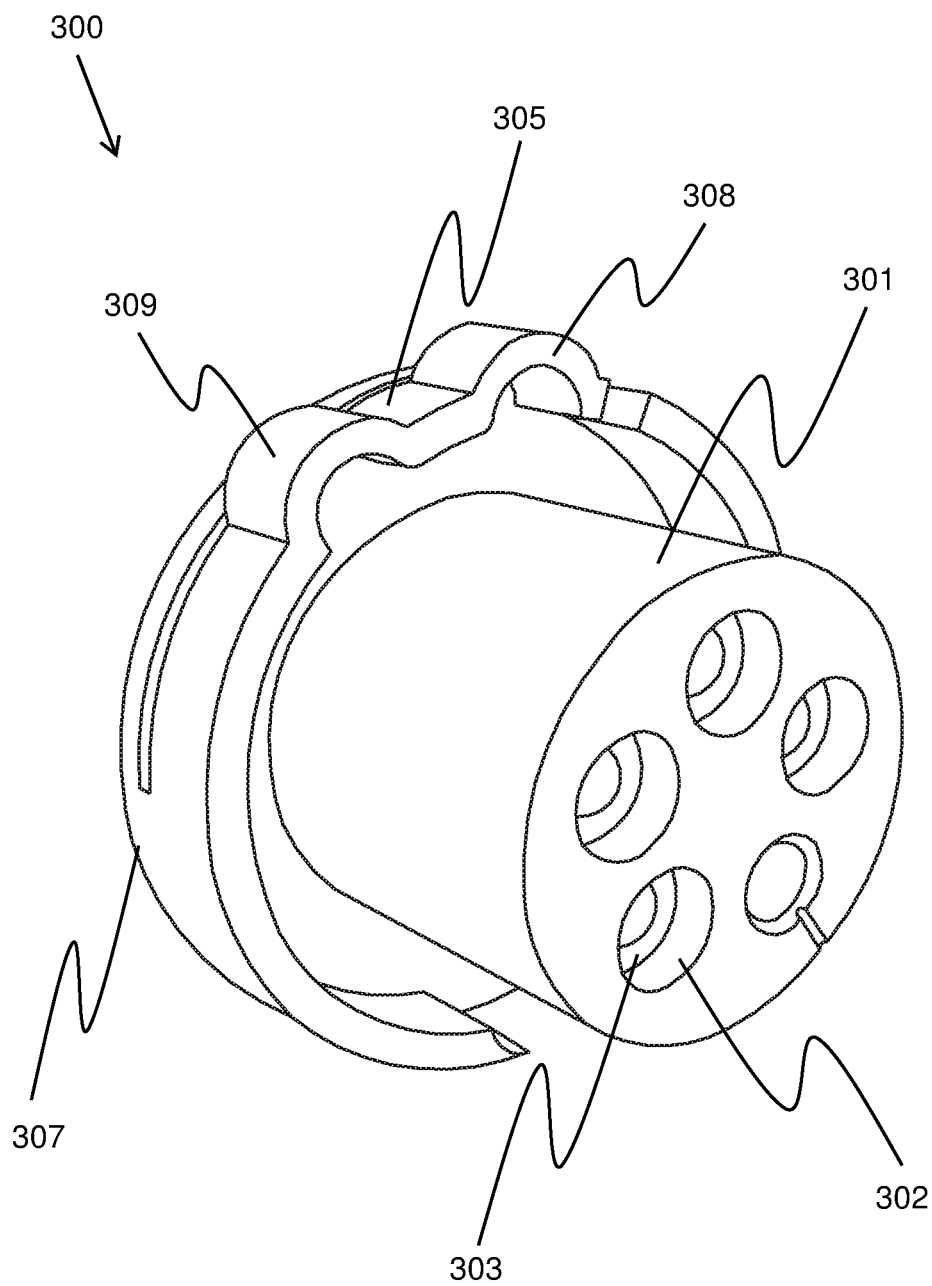
FIGS. 3A and 3B in perspective from the front and from the rear showing a female part of the electrical outlet.

The cylindrical sleeve 201 forms a bearing for a contact cylinder 301 of the female component 300. FIG. 3A shows that axial holes 302 are evenly distributed circumferentially on the contact cylinder 301 and a contact sleeve 303 of conductive material is mounted in each hole. In this embodiment, the number of contact sleeves is five, representing a three phase outlet with three phases, GND and 0 (neutral). The contact cylinder 301 ends with a flange 307, on which a flexible, curved locking arm 305 extends around the contact cylinder 301; in this embodiment, approx. 45°. The locking arm 305 has two recesses 308, 309, which are separated in the peripheral direction of the flange 307. When the female component of the contact cylinder 301 is inserted into the cylindrical sleeve 201 the locking arm 305 is placed radially outside the cylindrical sleeve 201 and may at rotation of the female component interact with the locking ridge 204 by the snapping of the locking arm 305 over the locking ridge, so that the locking ridge moves from the recess 308 to the recess 309. In this way, two distinct positions for contact cylinder 301 are shown for the user. Optionally, the female member 300 may be rotatable by means of the power plug 600 inserted in the female member 300.

Figure 3B:
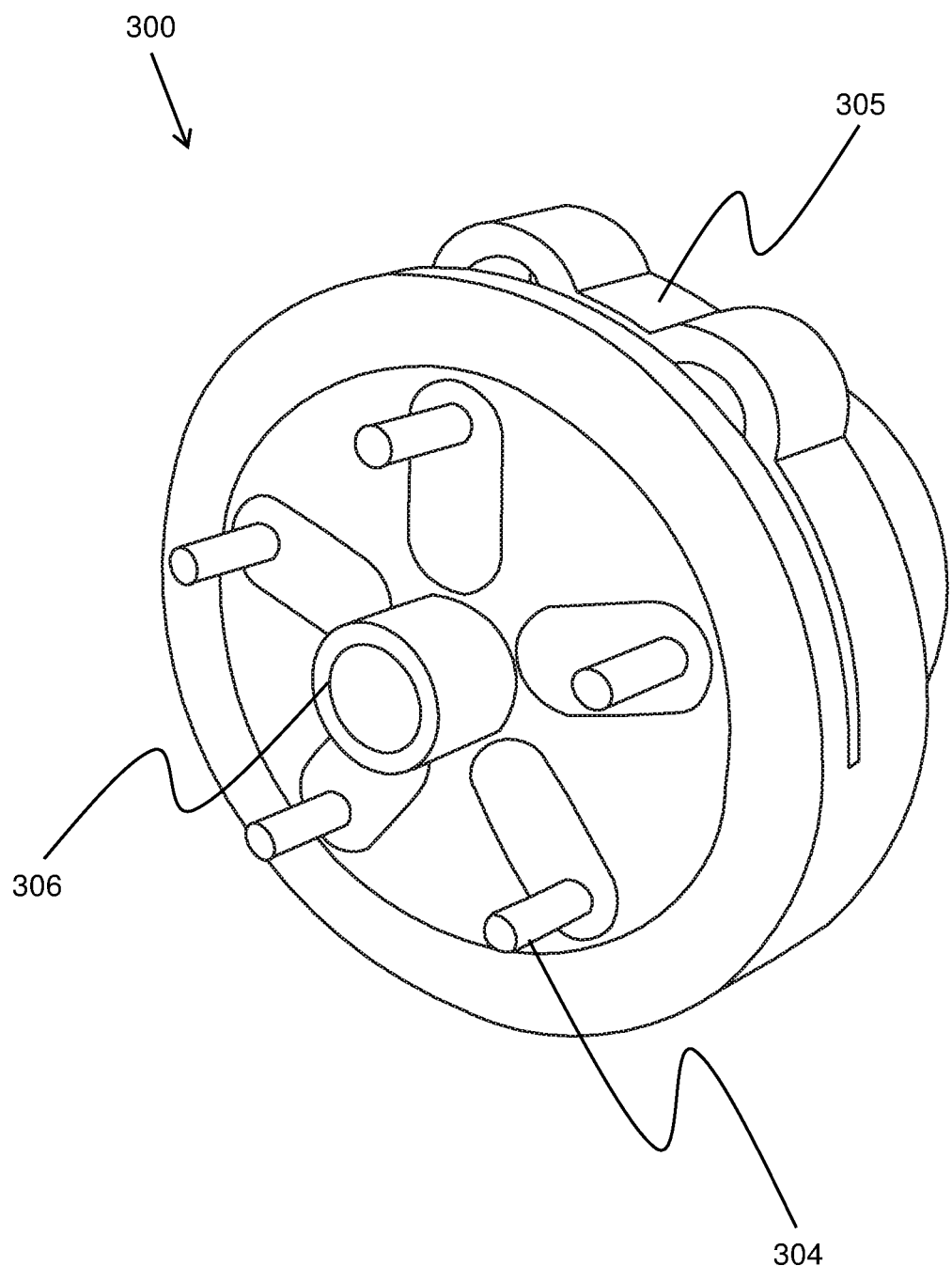
Figure 5A:
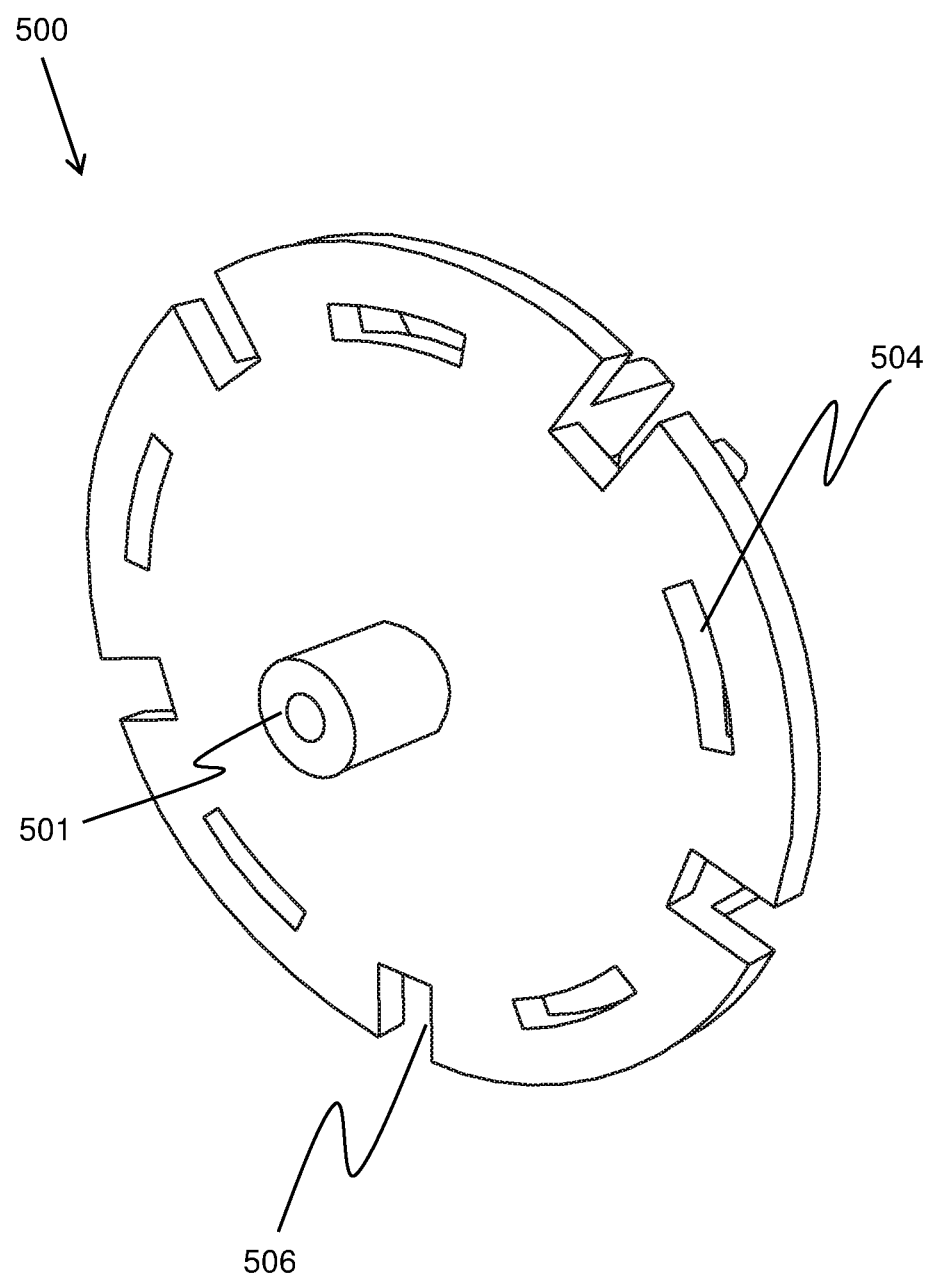
FIGS. 5A and 5B in perspective from the front and from the rear showing a mounting plate of the electrical outlet.
Figure 5B:
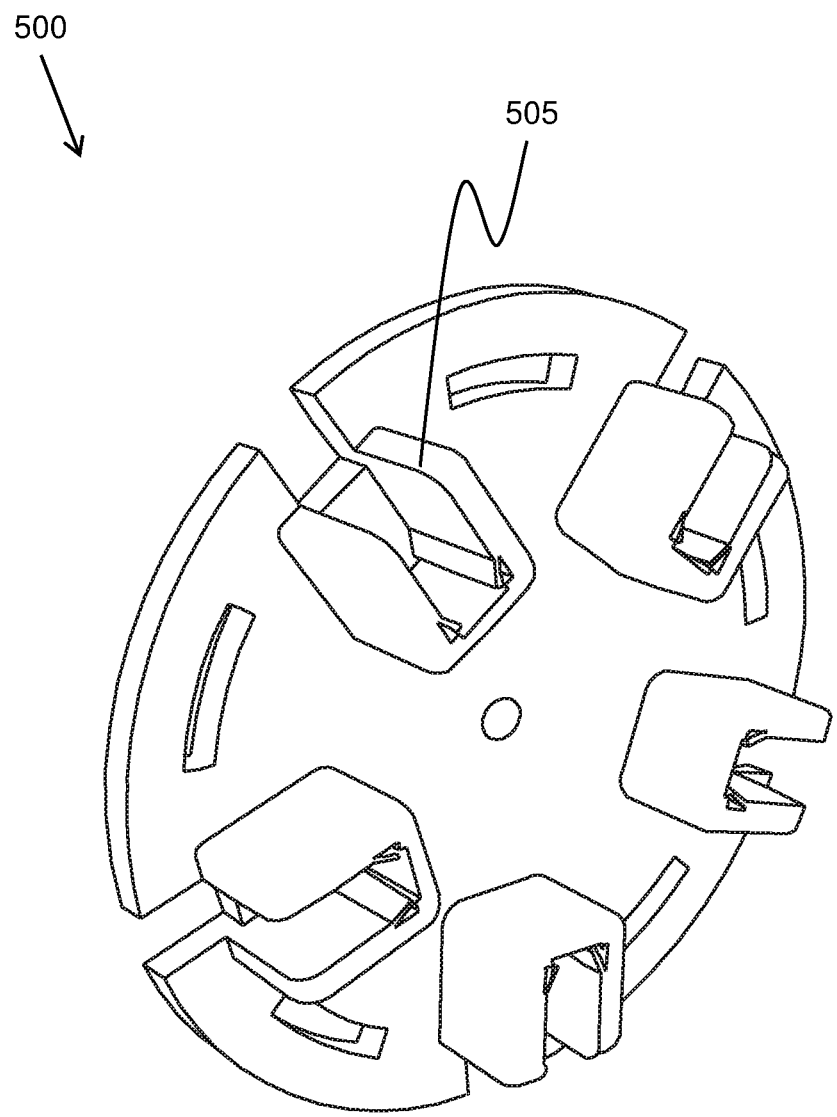

FIG. 3B shows the rear part of the female component 300, which part is provided with a cylindrical centre sleeve 306, which is intended to receive a centre pin 501 (FIG. 5A) on the mounting plate 500 for the suspension of the female component 300. Contact pins 304 are evenly spaced around the centre sleeve 306. The contact pins are electrically connected to its respective connector sleeve.

Figure 4:
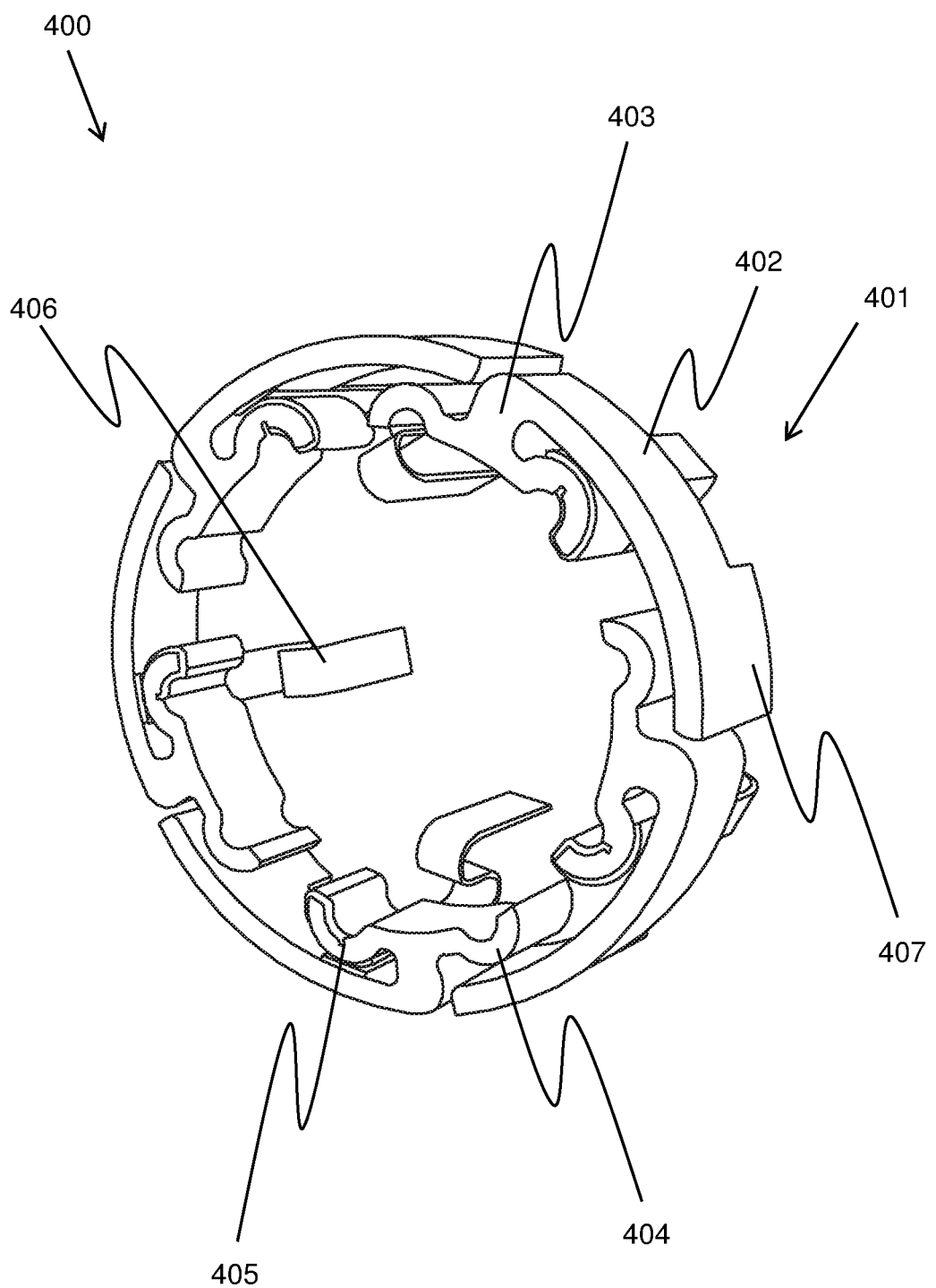
FIG. 4 in perspective from the front shows a connection ring of the electrical outlet.

FIG. 4 shows the connection ring 400, which consists of five connection rockers/tilting levers 401. The rockers are each removable mounted on the mounting plate 500. The connecting rocker consists of a curved part 402 and a connection part 403, extending radially inwards into the ring at a first end of the curved part. The other end of the curved part has a thickened part 407 which is intended to be inserted into a slot 504 in the mounting plate. The connection part 403 is T-shaped, wherein the web of the T is directed radially towards the mounting plate center and wherein legs of the T each have a recess 404 and 405 respectively. An electrically conductive connection plate 406 is mounted on one leg and bent around the leg to form an electrical contact in the recess 405.

The rockers are mounted in a ring on the front of the mounting plate. To support the rocker on the mounting plate 500 its other end is inserted in the slot 504 and the connection plate 406 rests in a cradle 505 on the mounting plate via a recess 506 in the mounting plate. The first end of the rocker is thereby movable. The part of connection plate 406 resting in the cradle 505 is S-shaped. Threads from the mains supply (not shown) are connected to the free end of the connection plate 406. The S-shape takes up motions of the connecting rocker and reduces the risk of contact breaks.

Assembly of the electric socket components is made in the following way. The cylindrical part of the female component 300 is pushed into the cylindrical sleeve 201 of the front 200 so that the recess 308 engages the ridge 204. The rockers 401 are mounted on the mounting plate 500, which is pushed onto the female part so that the mounting plate center pin 501 is pushed into the centre sleeve 306. The mounting plate is oriented so that the recess 404 on every rocker engages the contact pin on the female component. The outlet is now in a condition when no power is applied on the connection sleeves.

Figure 6A:
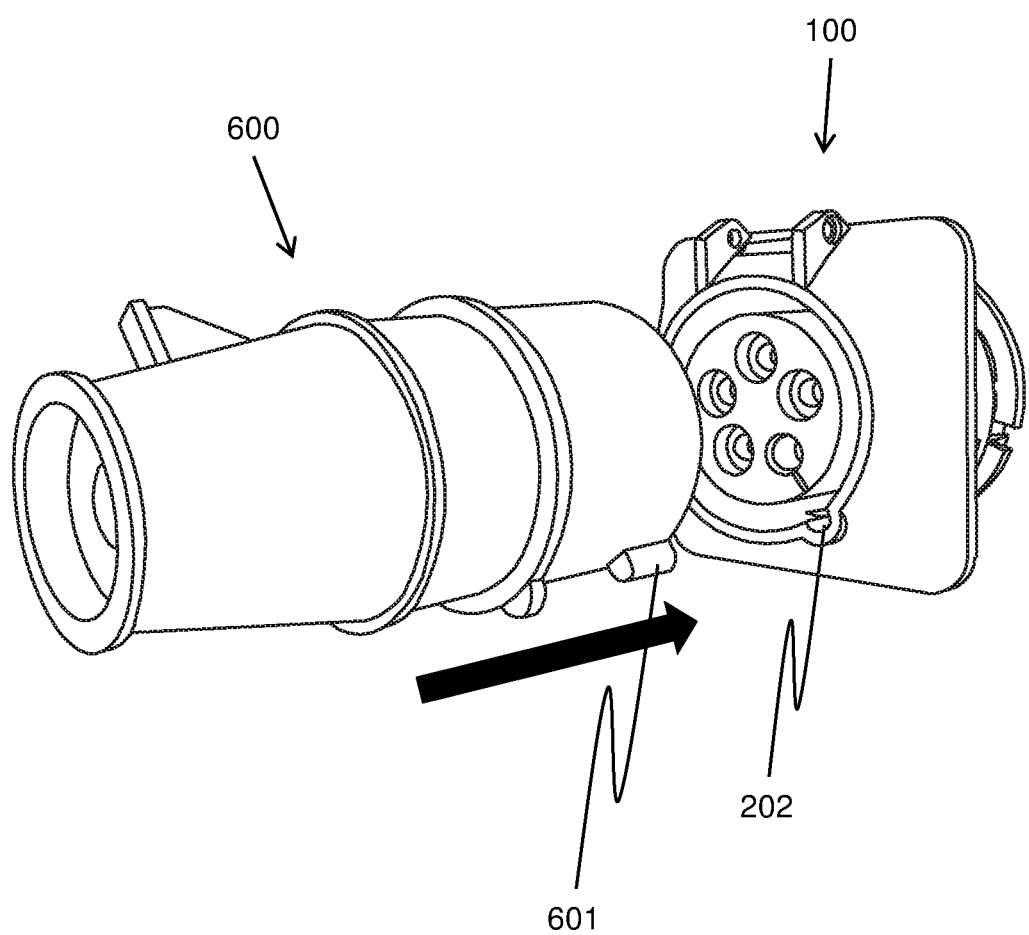
FIGS. 6A, 7A and 8A in perspective from the front shows how a power plug can be inserted into the electrical outlet in order to change the socket from a non conductive to an energized state.
Figure 6B:
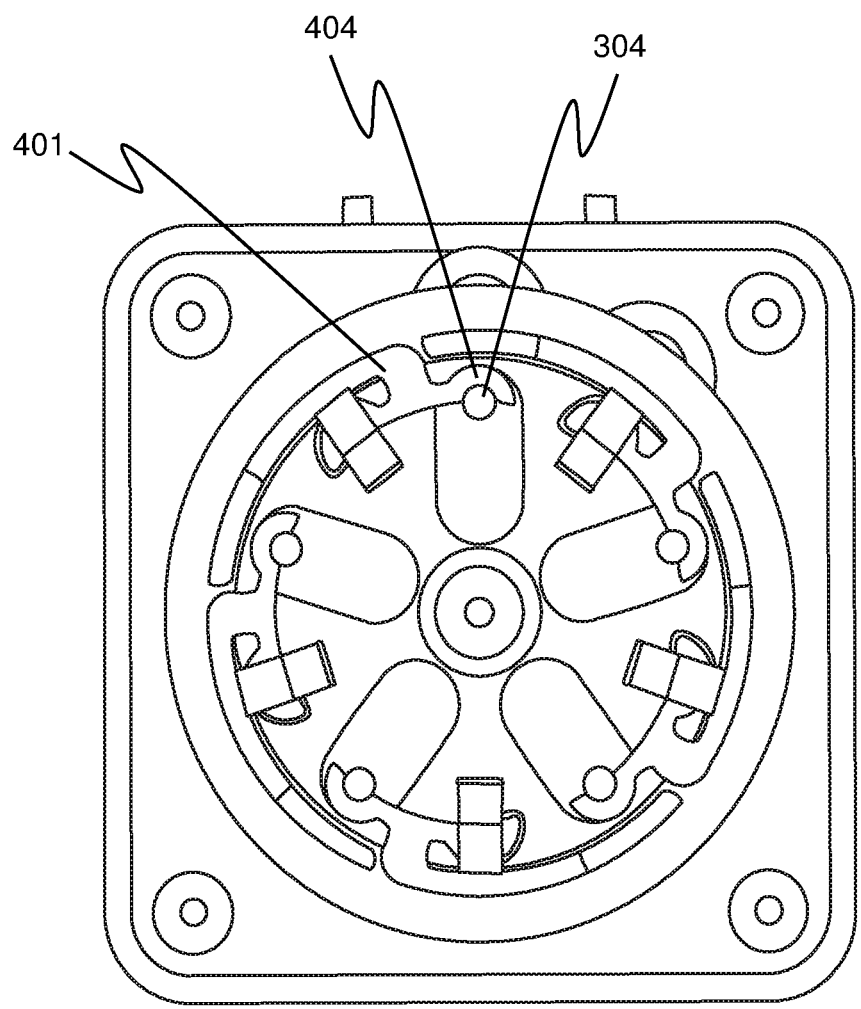
FIGS. 6B, 7B and 8B from behind showing different positions of the female part in relation to the connection ring.

Operation of the electrical outlet according to this embodiment will now be described with reference to FIG. 6-8. FIG. 6A shows how an EV plug 600 is inserted into the electrical outlet via the front 200. A ridge 601 on the EV Plug is fitted into the axial groove 202 in front cylindrical sleeve 201. FIG. 6B shows that the electrical outlet is de-energised by the location of the contact pins 304 in the recess 404 in the rocker 401.

Figure 7A:
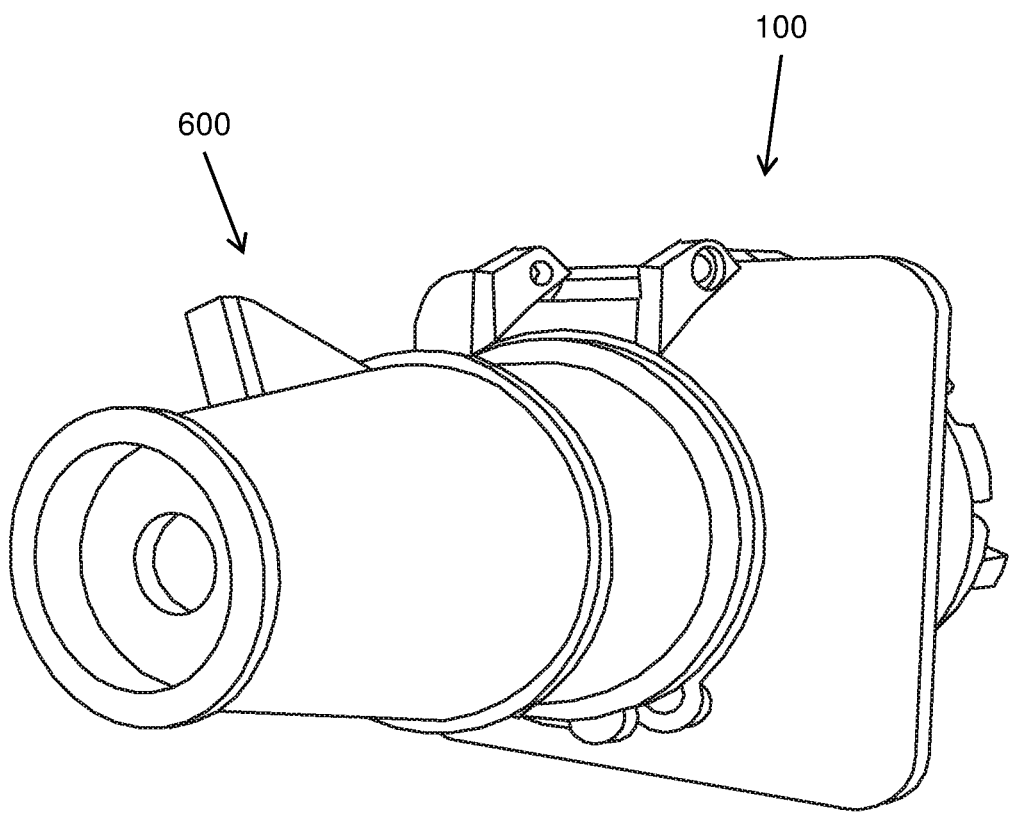
Figure 7B:
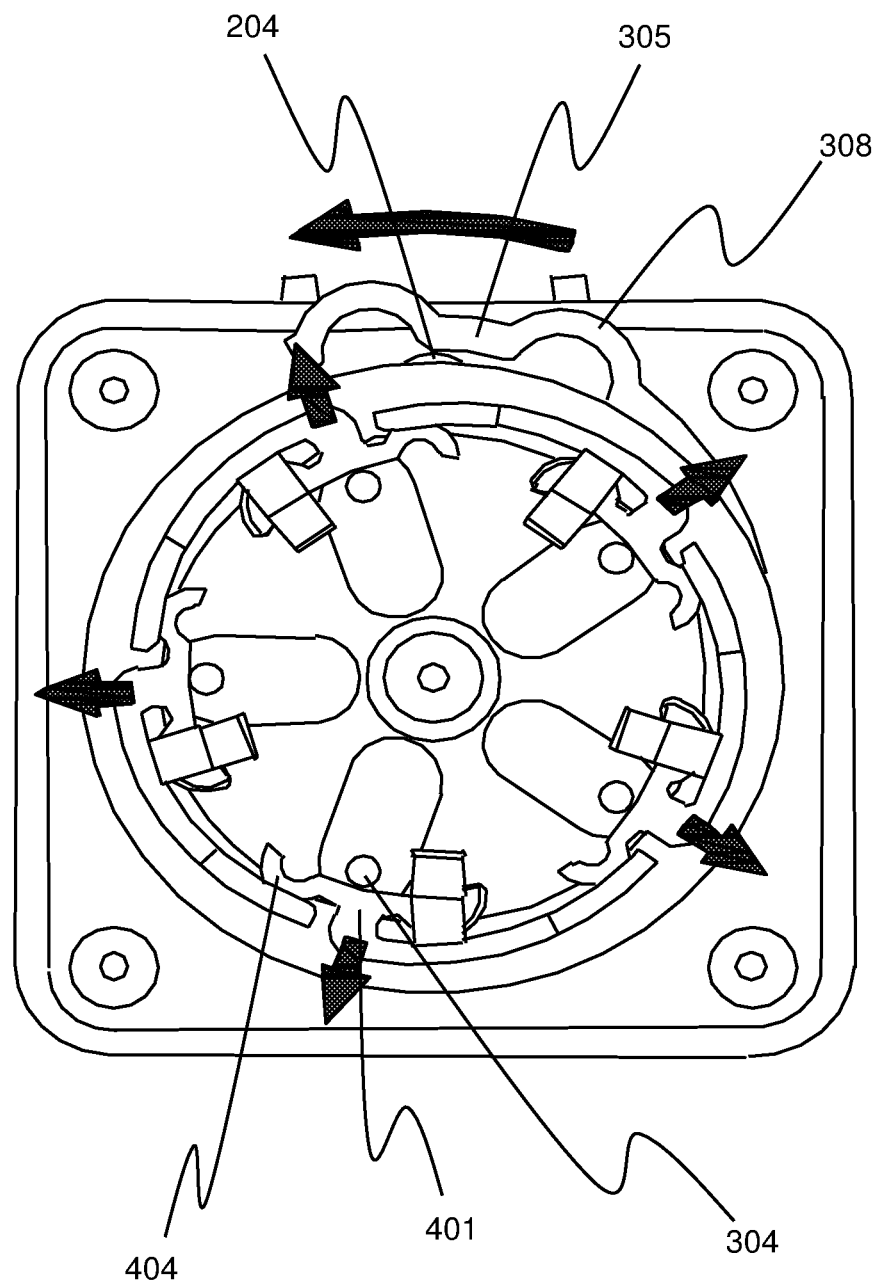

In FIG. 7A the EV plug has been inserted into the outlet to a position where the ridge 601 lies in the groove 203 and rotated clockwise about half the length of the groove 203. FIG. 7B shows that the locking arm 305 is flexed outwards and the recess 308 has left the locking ridge 204. The contact pin has similarly pressed the rocker outwards and left the recess 404. The socket remains de-energised.

Figure 8A:
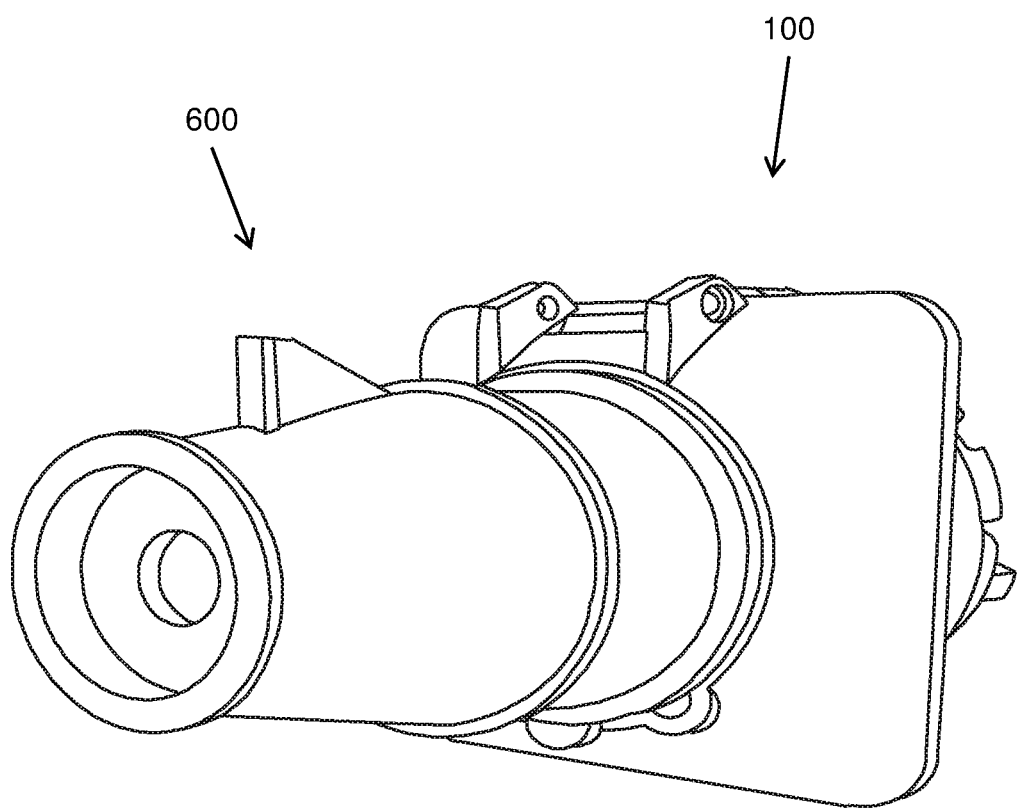
Figure 8B:
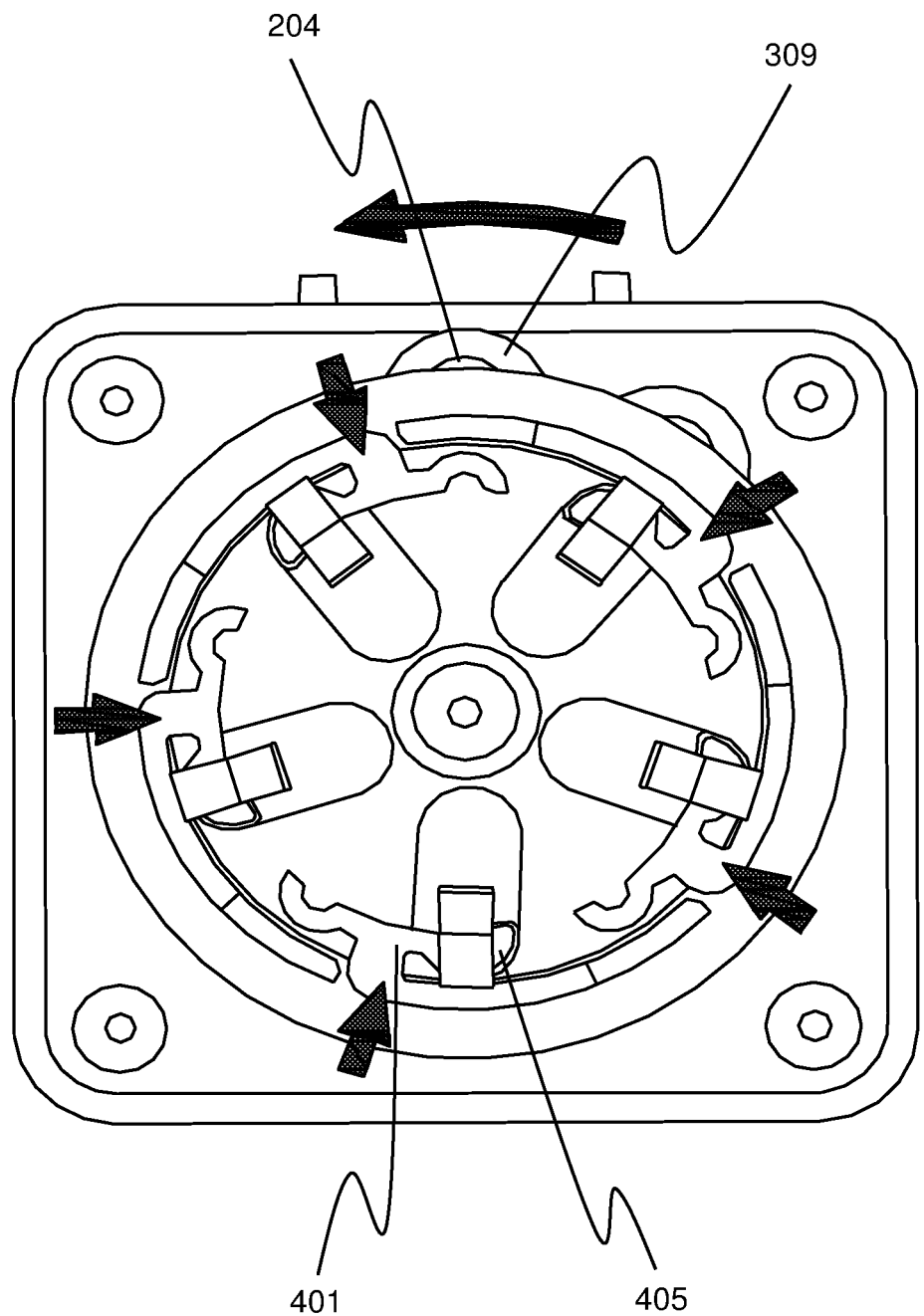

In FIG. 8A has EV plug that has been rotated so that the ridge 601 has reached the bottom of the groove 203. FIG. 8B shows that the other recess 309 has passed over the ridge 204. The contact pins have been inserted into the respective recess 405. The contact pins will come in contact with connection plates and the outlet is energized.

In the shown embodiment all the connector pins are at the same time connected or not connected to connection plates.

In a three phase outlet including GND, it may be appropriate for security reasons that the GND contact pin is always in contact with earth. Therefore, the corresponding connection plate extend over the entire connection part, i.e. from the recess 404 to the recess 405.

The present disclosure is not confined to the described embodiment. For example, the female component rotation between unpowered and powered mode may be replaced by an axial displacement relative to the body so that the connecting means on the female component is brought into contact with the connector means on the connector body. A further option is to perform a female component is moving in a plane, preferably vertically or horizontally, wherein connectors is brought in contact with each other by a tilting movement.

The locking arm in the embodiment can be excluded. The contact pin movement between the recesses 404 and 405 can be sufficient as a location marking between two working modes.

The invention claimed is:

1. An electrical outlet, which has a female member with at least two electrically conductive contact sleeves for the reception of pins on a plug inserted in the female member and a connecting means for connection of the electrical outlet to a mains supply, wherein:

the female member is movable relative to the connecting means between a first mode, in which the contact sleeves are electrically disconnected from the mains supply, and a second mode, in which the contact sleeves are electrically connected to the mains supply;

the connecting means comprises a connection ring and a mounting plate; and the connecting means further comprises connection plates, whose number corresponds to a number of contact sleeves on the female member, and the connection ring comprises connection parts, whose number corresponds to a number of the connection plates which are electrically connected to the mains supply, wherein each of the connection parts has a first recess and a second recess, and each second recess is in electrical contact with a corresponding one of the connection plates, and wherein by movement of the female member, each contact sleeve is connected to the second recess so as to bring the contact sleeve in contact with the connection plate or each contact sleeve is connected to the first recess so as to bring the contact sleeve out of contact with a connection plate.

2. The electrical outlet according to claim 1, wherein the female member is rotatable relative to the connecting means.

3. The electrical outlet according to claim 1, wherein the female member is rotatable by means of a power plug inserted in the female member.

4. The electrical outlet according to claim 1, wherein the female member is rotatively suspended between a fixedly mounted front of the power outlet and the connecting means.

5. The electrical outlet according to claim 1, wherein the connection plates and the contact sleeves are positioned radially separated.

* * * * *